United States Patent [19]

Bishop

[11] Patent Number: 4,605,096
[45] Date of Patent: Aug. 12, 1986

[54] LADDER BASE SWIVEL WITH A THROUGH WATER CHANNEL

[76] Inventor: Joseph I. Bishop, 45 S. Forge Mannor Dr., Phoenixville, Pa. 19460

[21] Appl. No.: 615,992

[22] Filed: May 31, 1984

[51] Int. Cl.[4] ............................................. F16L 27/08
[52] U.S. Cl. ........................................ 182/51; 285/94
[58] Field of Search ...................... 285/94; 182/51, 52, 182/65

[56] References Cited

U.S. PATENT DOCUMENTS

| | | | |
|---|---|---|---|
| 2,770,475 | 11/1956 | Rafferty | 285/94 |
| 3,905,450 | 9/1975 | Persson | 285/94 |
| 4,487,435 | 12/1984 | Yamatani | 285/94 |

Primary Examiner—Reinaldo P. Machado
Attorney, Agent, or Firm—Ratner & Prestia

[57] ABSTRACT

An improved ladder base swivel with a through water channel is provided wherein an annular seal preventing passage of liquid from a cylindrical bore to the exterior of a rotatably-received mating bore is provided with a lubricant. A lubricant reservoir channel which communicates with the seal supplies lubricant to the seal to prevent the seal from drying and cracking and to minimize wearing of the seal. The reservoir also communicates with an external opening which is normally plugged, thereby serving as a water escape channel upon seal failure. Continuous hydraulic and electric circuits are provided between the rotating elements of the swivel.

4 Claims, 2 Drawing Figures

«4,605,096»

LADDER BASE SWIVEL WITH A THROUGH WATER CHANNEL

BACKGROUND OF THE INVENTION

A. Field of the Invention

This invention relates to a ladder base swivel with a water channel and, in particular, to such a swivel having a water seal wherein the seal is in communication with a lubricant reservoir for seal lubrication.

B. Background Art

Aerial ladders such as those used on fire trucks must be rotatable with respect to the fire trucks upon which they are mounted, hydraulically extensible, and capable of delivering water and electric cables for control. Therefore, these ladders must be mounted upon hydraulic swivels which are capable of passing water at high flow rates while rotating without allowing the water to interfere with the hydraulic or electric circuits.

Conventionally, this is accomplished by a swivel having a metal housing and a rotatable body having a water channel wherein channels for hydraulic circuits are formed between the body and the housing and rotatable slip rings provide continuity in the electric circuits. This requires a seal to prevent the water passing through the body of the swivel from leaking and interfering with the hydraulic or the electric circuits.

As an added protection for the electrics and hydraulics, a waterway escape channel, communicating with a waterway escape port, was provided between the seal and the electrics since this seal is subject to eventual wearing, drying, and cracking. Thus, when a seal failed, water was directed through the channel to the escape port and was not permitted to come in contact with the hydraulic or electric circuits. A swivel of this type has previously been manufactured by the present Applicant. However, this swivel had no seal lubrication or other protection for preventing seal failure.

There were several common causes of seal failures in the swivels. One was the eventual wearing, drying and cracking of the seals. Another was the effect of the high mineral content of the water commonly used by municipalities for extinguishing fires. These minerals, in addition to damaging the seal, caused corrosion of the metal body around the seal causing more leakage around the seal, as well as roughening the surface of the metal and wearing the seal more quickly.

It is therefore an object of this invention to prevent hydraulic swivel seals from drying and cracking and to thereby extend their useful lifetime.

It is a further object of this invention to provide lubrication of the water channel seals in an hydraulic swivel to lessen the wear caused by rubbing.

An additional object of this invention is to provide a lubricant coating to the metal surfaces in the vicinity of the seal and to thereby inhibit the corrosion of the surfaces by mineral-laden water and the consequent wear of the seal.

SUMMARY OF THE INVENTION

An improved ladder base swivel with a through water channel is provided wherein an annular seal preventing passage of liquid from a cylindrical bore to the exterior of a rotatably-received mating bore is provided with a lubricant. A lubricant reservoir channel which communicates with the seal supplies lubricant to the seal to prevent the seal from drying and cracking and to minimize wearing of the seal. The reservoir also communicates with an external opening which is normally plugged, thereby serving as a water escape channel upon seal failure.

DETAILED DESCRIPTION OF THE INVENTION

Figure 1:
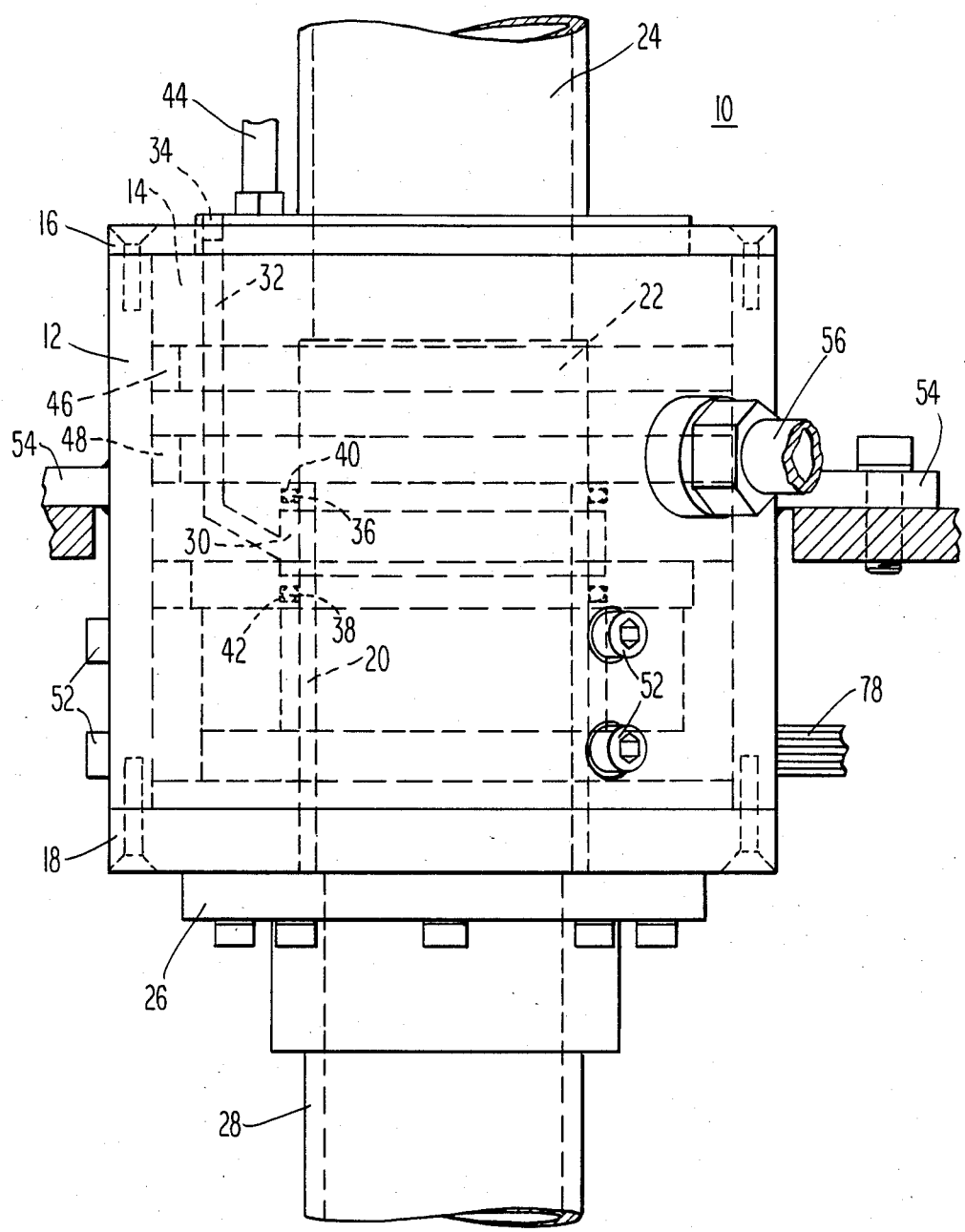
FIG. 1 is a side view of the improved ladder base swivel of the present invention.

FIG. 1 shows a side view of improved ladder base swivel 10. Swivel 10 comprises a housing 12, a rotatable body 14, a top cover 16 and a bottom cover having a planar element 18 and an upwardly extending mating tube member 20. Body 14 has a cylindrical waterway passage bore 22 running its entire length. Bore 22 rotatably receives mating tube member 20 and threadably receives threaded pipe 24, thereby providing a waterway passage entirely through swivel 10 from pipe 24 at the top of swivel 10 to flange 26 which is secured to planar element 18, and therethrough to pipe 28.

A groove on the inner surface of bore 22, acting cooperatively with the outer surface of tube member 20, forms an annular lubricant reservoir 30 completely surrounding member 20. Lubricant reservoir 30 contains a lubricant such as an oil. Channel 32, through body 14, also contains a lubricant and communicates with reservoir 30 and with waterway seal lubrication and drainage opening 34.

Lip seal 36 in groove 40 in body 14 completely surrounds tube member 20 just above lubricant reservoir 30, exerting compressive force against the inner surface of body 14 and the outer surface of tube member 20. Seal 36 is coated with polytetrafluoroethylene (PTFE), commonly sold as Teflon. Body 14 and tube member 20 rotate with respect to each other when hydraulic swivel 10 is swivelled and water flows from tube member 20 to bore 22 of body 14. Thus, seal 36 serves to prevent water from leaking from bore 22 to the outside of member 20. Lubricant from reservoir 30 leaks to groove 40 and soaks seal 36, causing a rubber center within seal 36 to swell and preventing seal 36 from drying out and cracking. Additionally, lubricant from reservoir 30 lubricates seal 36 and coats the metal surfaces of body 14 and member 20 between groove 40 and reservoir 30, thereby inhibiting water corrosion and corrosion due to the minerals in the water.

Ears 54, welded to housing 12, are typically secured to a fire truck. Pipe 24, which is threadably secured to body 14 and delivers water to an aerial ladder assembly, rotates with respect to housing 12. Thus, the aerial ladder assembly is rotatable with respect to the fire truck while receiving water from the fire truck. It should be noted that the embodiment shown in FIG. 1 may also be mounted upside down without alteration. When swivel 10 is used in this manner, ears 54 are secured to the aerial ladder while pipe 24 and bore 22, stationary with respect to the fire truck, deliver water to the rotating ladder.

Figure 2:
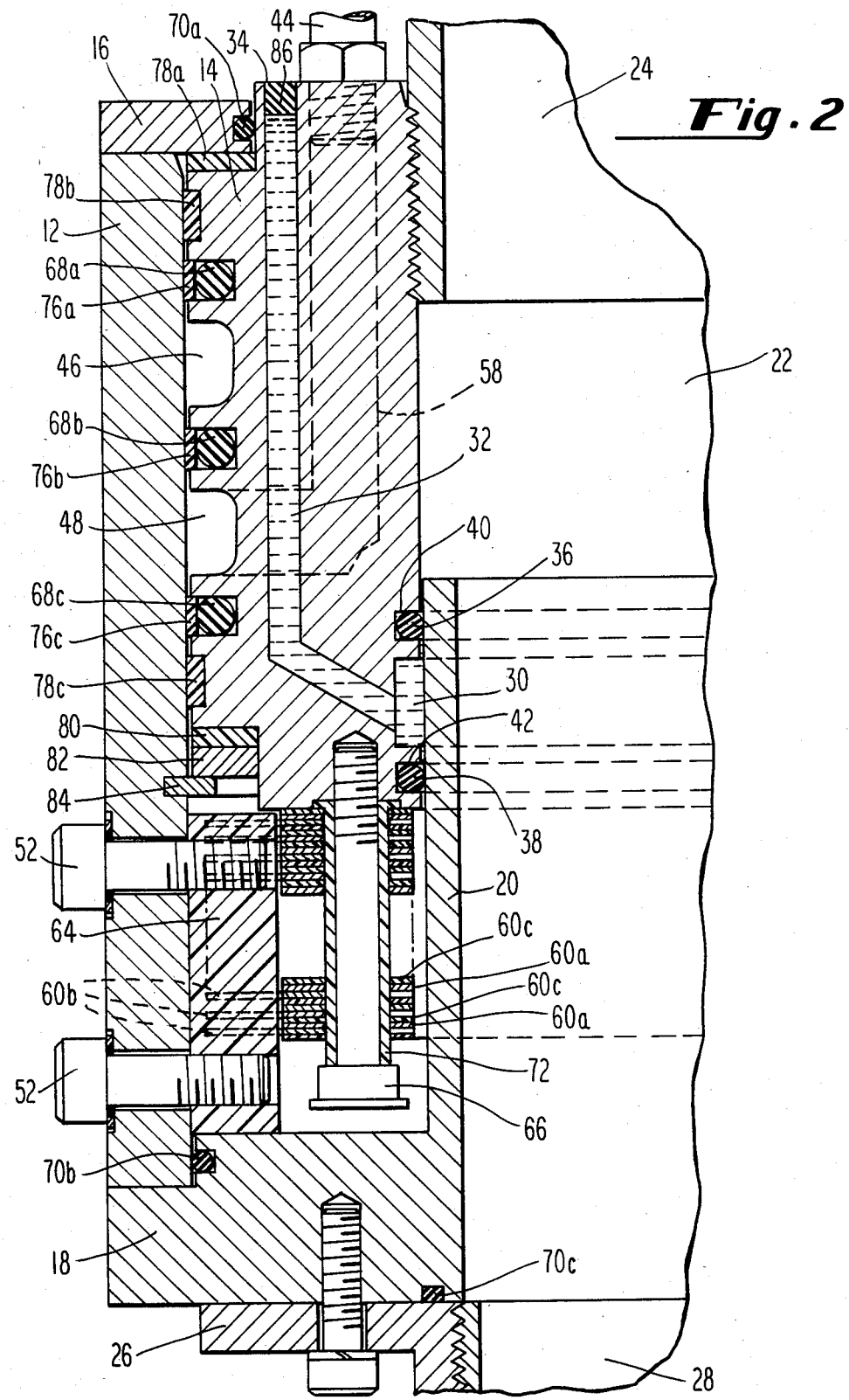
FIG. 2 is a quarter-section of the improved ladder base swivel of FIG. 1.

Referring now to FIG. 2, a quarter-section of swivel 10 is shown. Reservoir 30 is shown formed by the outer surface of member 20 and a groove in body 14. Channel 32, communicating with reservoir 30, is shown with a plug 86 at opening 34. Plug 86 prevents lubricant from reservoir 30 and channel 32 from leaking out of opening 34. When lip seal 36 fails, water pressure from bore 22 is applied to reservoir 30. This pressure is applied through channel 32 to plug 86, forcing plug 86 through opening 34, thus allowing reservoir 30 and channel 32 to function as an escape waterway and opening 34 to function as a water escape port.

Below lubricant reservoir 30, in the direction shown in FIGS. 1 and 2, is an annular groove 42 in the inner surface of bore 22. Groove 42 receives lip seal 38 which exerts compressive force against the inner surface of bore 22 and the outer surface of tube member 20. Lip seal 38 is formed of the same materials as lip seal 36 and is also lubricated by the lubricant in reservoir 30. Groove 42 and lip seal 38 are interposed between reservoir 30 and electrical slip rings 60, thereby preventing lubricant from lubricant reservoir 30 from leaking to electric slip rings 60$a,b,c$. Additionally, when lip seal 36 fails, causing reservoir 30 to become filled with water to be channeled out opening 34, lip seal 38 prevents the water in reservoir 30 from passing to slip rings 60$a,b,c$.

Swivel 10 also provides an hydraulic circuit. Hydraulic port 44, which is stationary with respect to body 14, communicates with hydraulic channel 48 through channel 58 in body 14. Channel 48 is formed by an annular groove in the outer surface of body 14 acting cooperatively with the inner surface of housing 12. As body 14 rotates, channel 48 continuously communicates with hydraulic port 56 (shown in FIG. 1) which is stationary with respect to housing 12. Ports 44 and 56, therefore, rotate with respect to each other while maintaining hydraulic communication. While FIG. 2 shows only one such hydraulic circuit, swivel 10 may contain a plurality of hydraulic circuits. For example, a second hydraulic channel 46 is shown. Channel 46 may communicate with input and output ports (not shown) in the same manner that channel 48 communicates with ports 44 and 56.

A plurality of metal electrical slip ring contacts 60$a,b$, below seal 38, provide electrical continuity through swivel 10. Threaded bolt 66, surrounded by electrical insulator 72, passes through a circular opening in slip ring 60$a$ and is threadably secured to body 14, thus causing slip ring 60$a$ to be stationary with respect to body 14. Slip ring 60$b$, extending radially beyond slip ring 60$a$, is grooved to mateably receive plastic block 64. Plastic block 64 is secured to housing 12 by threaded bolts 52. Thus, slip ring 60$b$ is stationary with respect to housing 12. As body 14 rotates with respect to housing 12, slip ring 60$a$ rotates with respect to slip ring 60$b$ while maintaining constant electrical contact. Slip ring 60$b$ is electrically coupled to a wire in wire bundle 78 (shown in FIG. 1) which passes through an opening in housing 12. In a similar fashion, slip ring 60$a$ is electrically coupled to a wire passing through an opening at the top of housing 14 (now shown). Thus, electrical continuity through swivel 10 is provided. Between each pair of slip rings 60$a,b$, there is provided an insulating ring 60$c$ to isolate the pairs of slip rings 60$a,b$ from each other.

Swivel 10 is provided with a plurality of conventional seals for protective purposes. Seals 74$a,b,c$, for example, provide closure between planar element 18, housing 12, flange 26, and body 14. Seals 68$a,b,c$ acting cooperatively with annular cap seals 76$a,b,c$, isolate and seal hydraulic channels 46 and 48. Bearings 78$a,b,c$ position body 14 within housing 12 and cover 16 and minimize rotational friction. These bearings are formed of PTFE as is thrust bearing 80. Thrust ring 82 is formed of a metal. Snap ring 84 is received in a groove in the inner wall of housing 12 and supports body 14.

While this invention has been described with reference to specific embodiments thereof, it is not limited thereto. Instead, the claims which follow are intended to be construed to encompass not only the forms and embodiments of the invention shown and described, but also such other forms and embodiments and such variants and modifications thereof as may be devised by those skilled in the art without departing from the true spirit and scope of the present invention as may be ascertained from the foregoing description and accompanying drawings.

I claim:

1. In a ladder base swivel, the combination comprising:
   (a) a bottom cover having an annular planar element and an upwardly extending water passage tube,
   (b) a cylindrical body having a cylindrical water passage bore forming a continuous vertical water passage through said swivel, said body water passage bore adapted to rotatably receive said tube and having on its inner surface a first annular channel surrounding a portion of the received tube wherein said first channel contains a first annular lip seal for preventing the passage of water from said bore to the exterior of said tube,
   (c) a housing having an upper portion adapted to rotatably receive said body and a lower portion adapted to secure the planar element of said cover,
   (d) a second annular channel on the inner surface of said body water passage bore, said second channel containing a water displaceable oil lubricant and surrounding said tube below said first channel wherein said second channel communicates with said first lip seal,
   (e) a third annular channel in said bore, said third annular channel surrounding said tube below said second channel and communicating with said second annular channel and containing a second annular lip seal adapted to prevent the passage of the oil lubricant,
   (f) a continuous electric circuit through said swivel from the exterior of said housing to the exterior of said body, said electric circuit including electric contacts surrounding said tube below said third annular channel whereby said second lip seal prevents the passage of said oil lubricant from said second annular channel to said electric contacts and passage of water from said bore to said electric contacts upon failure of said first lip seal, and
   (g) an escape waterway completely surrounded by said body, said escape waterway communicating with said second channel and communicating with an opening on the exterior of said swivel independently of the relative positions of said body and said housing, said escape waterway and said second channel adapted to provide both a water escape path away from said electric contacts upon failure of said first lip seal and a reservoir for said oil lubricant.

2. The ladder base swivel of claim 1 wherein the first and second lip seals are adapted to swell on contact with the water displaceable oil lubricant and exert compressive force against said bore and said tube and wherein said first and second lip seals are formed with a low friction coating for permitting ease of rotation between said bore and said tube.

3. The ladder base swivel of claim 1 further comprising:
an annular hydraulic channel on the outer surface of said body, said hydraulic channel surrounded by the inner surface of said housing, and
means for said hydraulic channel to communicate with the exterior of said body and with the exterior of said housing for providing a continuous hydraulic circuit through said swivel independently of said first, second and third channels and independently of the relative positions of said body and said housing.

4. The ladder base swivel of claim 1 wherein said opening is provided with a displaceable plug, said plug being displaceable in response to outward pressure.

* * * * *